Figure 1:
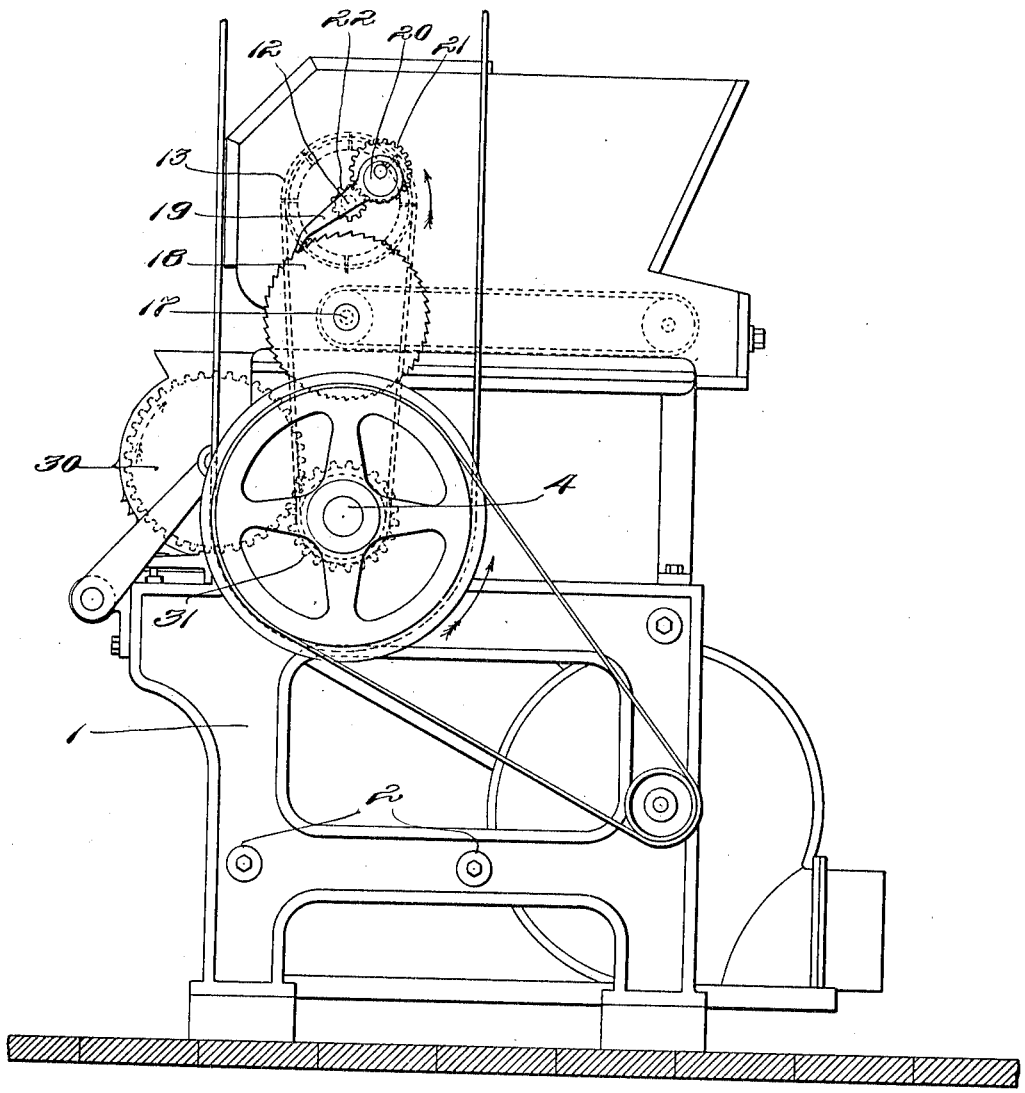

E. R. BULLOCK.
COTTON GIN.
APPLICATION FILED JUNE 9, 1911.

1,090,272.

Patented Mar. 17, 1914.

4 SHEETS—SHEET 3.

Witnesses:
C. L. Rogers
R. J. Hersey

Inventor:
Edwin R. Bullock.
by Geo. S. Maxwell
Atty.

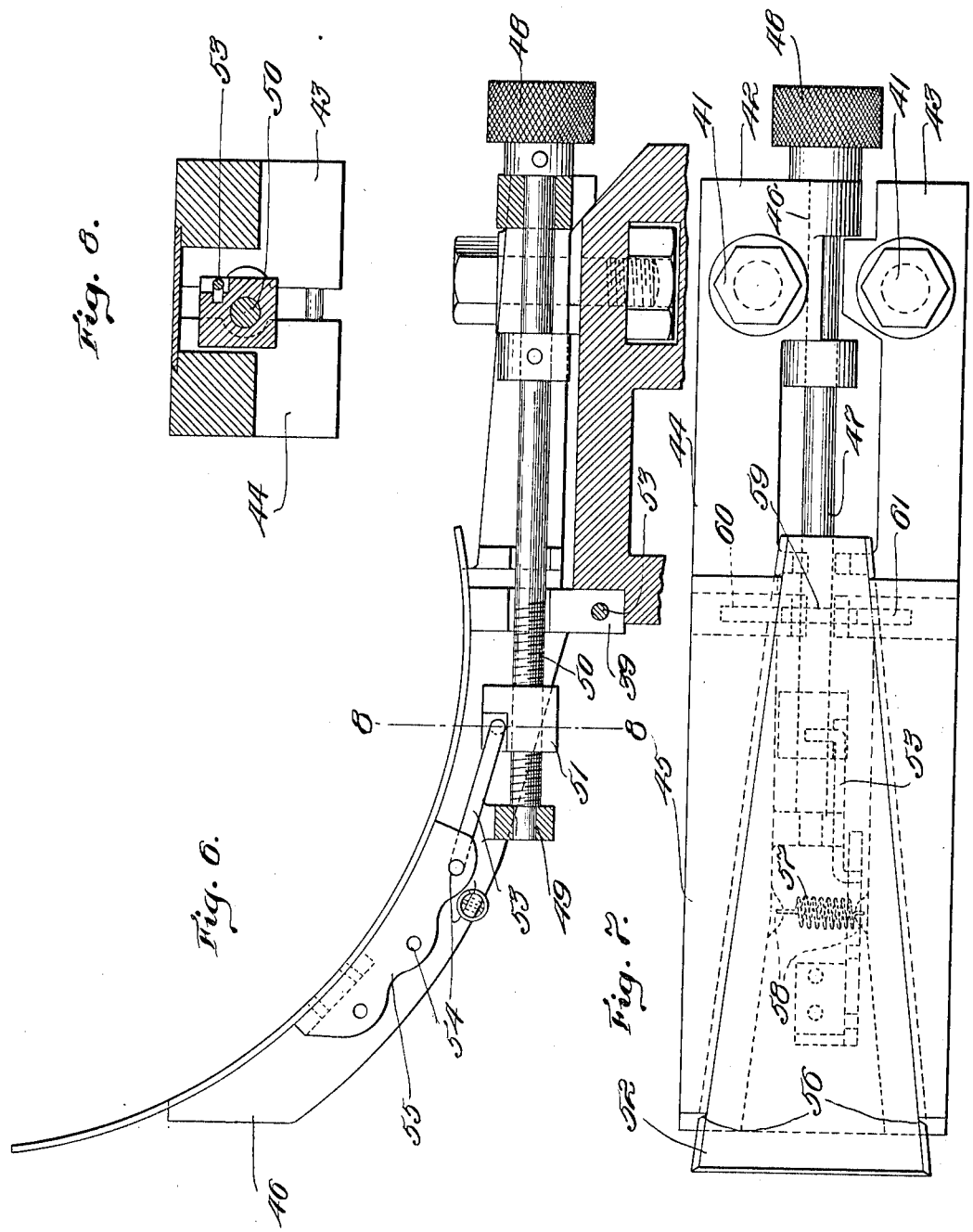

UNITED STATES PATENT OFFICE.

EDWIN R. BULLOCK, OF PAWTUCKET, RHODE ISLAND, ASSIGNOR TO UNITED COTTON GIN COMPANY, OF BOSTON, MASSACHUSETTS, A CORPORATION OF ARIZONA.

COTTON-GIN.

1,090,272.

Specification of Letters Patent. Patented Mar. 17, 1914.

Application filed June 9, 1911. Serial No. 632,271.

*To all whom it may concern:*

Be it known that I, EDWIN R. BULLOCK, a citizen of the United States, and resident of Pawtucket, county of Providence, and State of Rhode Island, have invented an Improvement in Cotton-Gins, of which the following description, in connection with the accompanying drawings, is a specification, like letters on the drawings representing like parts.

This invention relates to cotton gins, and particularly to what is known as a " disk gin ", *i. e.*, one in which the ginning surfaces are formed on the sides of disks fixed in spaced apart relation on a rotary shaft. The general object of gins of this type has been to combine, as far as possible, the large ginning capacity of the saw type of gins with the more gentle handling and freedom from tearing of the fiber, which is characteristic of the common roller gin. The gins of the disk type heretofore produced have, however, been subject to a number of objections, among which may be noted the difficulty of providing strippers to coöperate with the lateral ginning surfaces so as to effect the rolling action essential to strip the cotton from the seed as it is thrust against the stripper by the action of the disk surface. Further difficulties have been encountered in forming a lateral ginning surface which, while capable of exerting a lateral pull on the fiber to draw it past the edge of the stripper, should be capable of quickly releasing the fiber to fall away therefrom, or be easily separated from such surface after passing the stripper, and in connection therewith to provide a doffer which should coöperate with the lateral disk surfaces to clear the same before returning to ginning position.

My invention provides a gin capable of perfectly effecting these and other desirable results and, in the preferred embodiment shown, consists in a disk gin composed of a set of laterally spaced apart disks fixed on a rotary shaft, the sides of the disks being covered with small sharp, pyramidal or tapering projections, or teeth, providing sloping projecting surfaces from which the fiber is instantly separated by air currents, which are directed past the same so that the fiber is removed from the several disks into a chute for delivery to the press or other point by air currents.

Further features of the invention relate to an improved form of stripper arranged relative to the disk surfaces so that the cotton as presented thereto by the disks, is caused to roll along the edge of the stripper and thus the seeds are turned over and rolled along the edge of the stripper as the fiber is pulled from their several sides so that the stripping is effected without materially tearing or damaging the fiber. These strippers are adjustable into proper relation to the disk sides and to take up for wear in accordance with a further provision of the invention.

The invention further provides an improved distributer for supplying fiber continuously in properly apportioned quantities to the several disks of the set and particularly to the opposing faces of two adjacent disks.

The above and other features of the invention will be more fully understood from the following detailed description taken in connection with the accompanying drawings, and will thereafter be pointed out in the appended claims.

Figure 2:
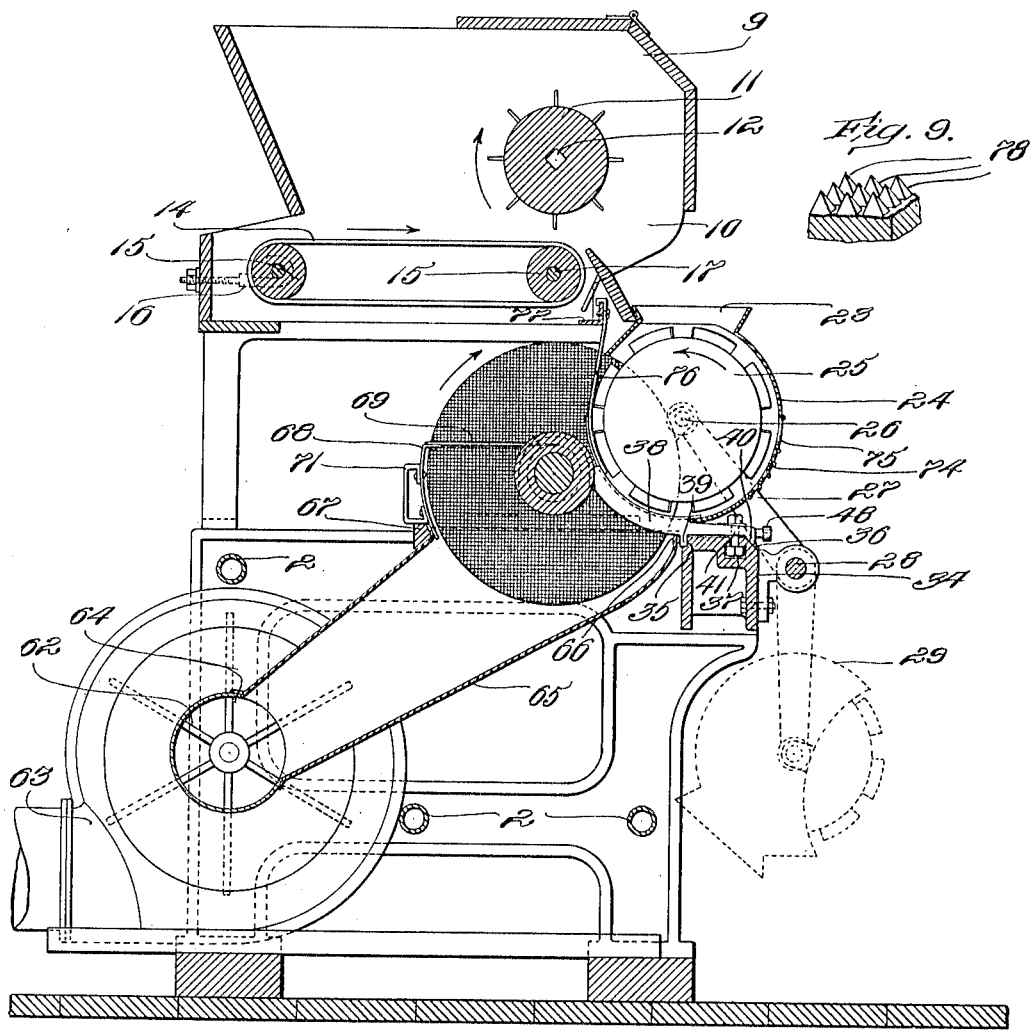
Figure 3:
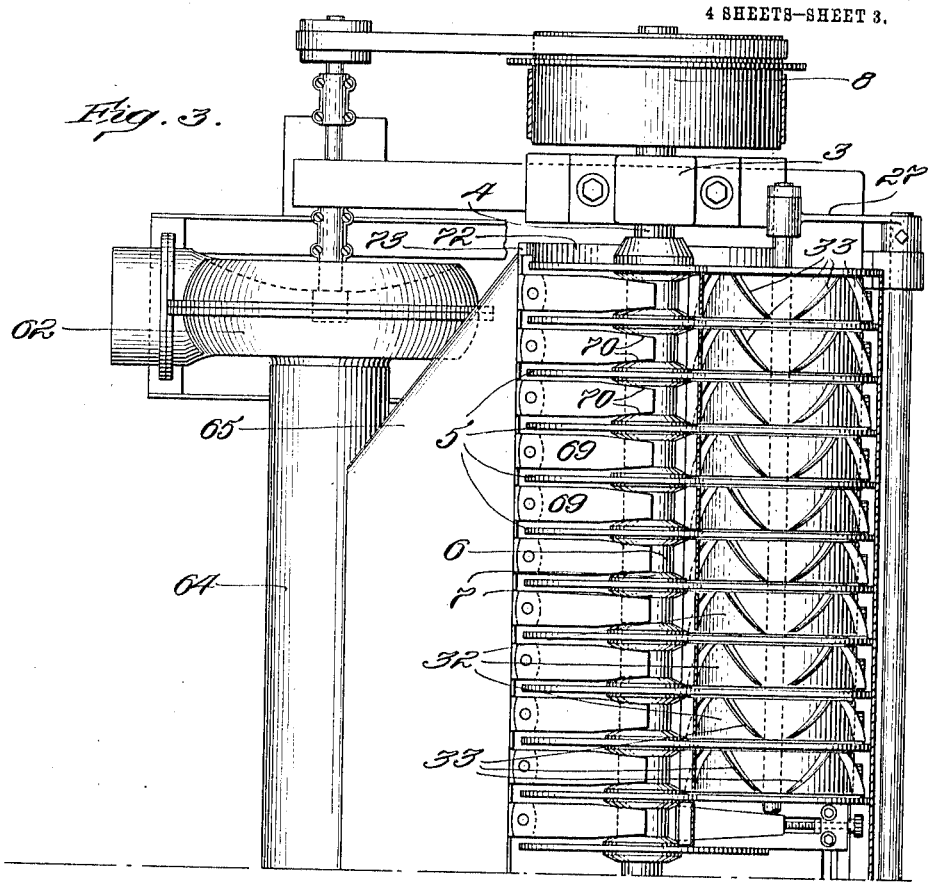
Figure 4:
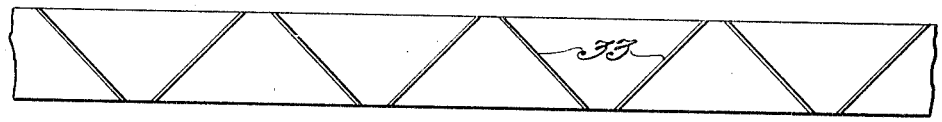
Figure 5:

Referring to the drawings: Figure 1 is an end elevation of the improved gin. Fig. 2 is a vertical section showing parts of the frame in elevation and looking in the opposite direction from Fig. 1. Fig. 3 is a plan view partly in section. Fig. 4 is an enlarged detail showing a development of the surface of one form of distributer. Fig. 5 is a corresponding detail showing a development of a modified form of distributer surface. Fig. 6 is a detail partly in vertical section of the improved stripper and a part of its support. Fig. 7 is a plan view of the stripper. Fig. 8 is a cross section on line 8, 8 of Fig. 6, and Fig. 9 is a detail of the ginning surface.

The framework of the gin is composed of end uprights 1 rigidly joined together by tie-bars or rods 2 and has formed therein at a suitable elevation bearings 3 for a shaft 4. This shaft has fixed thereon a set of ginning disks 5 clamped and held in spaced apart relation by spacing members 6, having cylindrical portions and end flanges 7 with their inner sides sloping for a purpose to be later described. The shaft 4, as shown, is driven by a belt pulley 8, and constitutes the main driving shaft of the machine, having geared therewith the other driven shafts as later explained, though all this is merely illustrative and other driving arrangements as found convenient in particular installations can be readily arranged. As typifying a suitable continuous and reliable feed to the disks, a hopper 9 is shown mounted on top of the framework, having mounted therein an adjacent delivery opening 10, a spiked drum 11 mounted on a shaft 12, having a pulley on an end thereof driven by belting 13 from a similar belt pulley on the driving shaft 4. Coöperative with the spiked drum 11 in feeding the cotton from the hopper 9 is a conveyer member 14 in belt form, which may be made as a flexible slat apron to pass around rollers 15, suitably journaled in the base of the hopper, one of these rollers having an adjustable mounting 16, and the other having its shaft 17 driven by a ratchet wheel 18 fixed thereon, operated by a pawl 19 moved by an eccentric 20 fixed to turn with the gear 21, operated by a pinion 22 on shaft 12, the parts being thus connected so that the spiked drum 11 and belt or slatted apron 14 move in the directions shown by the respective arrows in Fig. 2. Thus the cotton is regularly and continuously delivered through the opening 10 and guided into the throat 23 of the distributer casing 24, which is arranged directly underneath the same. The distributer 25 is as a whole cylindrical in form, being composed of short cylinder sections to enter between the ginning disks, and its casing 24 being formed to fit quite closely therearound and up between the several sections. The distributer is fixed on a shaft 26 carried by arms 27 at either end of the gin, these arms being fixed at their other ends to a shaft journaled in the frame at 28, and the distributer with its casing 24 being adapted to swing down out of operative position below the shaft 28, as seen in dotted lines 29 in Fig. 2. When in operative position the distributer casing and the supporting arms 27 fit against the framework and in this position it is driven in the direction indicated by the arrow in Fig. 1 by a gear 30 fixed thereto, meshing with a pinion 31 fixed on the shaft 4, this gearing being brought into mesh as the distributer is swung to operative position. The distributer, as stated, consists of a number of short cylinder sections 32 and these extend inward when the distributer is in operative position, to near the inner line of the ginning surfaces. These cylinder portions have fixed thereto obliquely extending fins, or blades, 33, these as shown in Figs. 2, 3, and 4, extending zigzag across the cylinder sections alternately in opposite directions, the purpose of these blades being to catch the bunches of cotton as delivered to the distributer throat 23 and apportion the same to the opposite disk surfaces with substantially equal deliveries to each, the fins or blades sloping toward the respective disk surfaces pushing the particular bunches of cotton engaged therewith against the corresponding disk faces. In Fig. 5 the blades 33ª are made in V form, each blade sloping from the center toward the adjacent disk face, so as to throw the bunches of cotton to one side or the other, according to which side of the blade engages them.

The framework is formed with a strong horizontal rail 34 extending the length of the gin, this rail having a vertical backing ledge 35, a beveled surface 36 at its front, and a T slot 37 extending lengthwise thereof. This rail provides a support on which are adjustably clamped the several stripper blades 38, these blades having projections 39 to engage the ledge 35 and beveled projecting portions 40 to engage the beveled surfaces 36, the blades being drawn down and clamped to the rail by bolts 41 which extend into the T slot 37. The beveled surface 36 on the rail in conjunction with the beveled projections 40 on the strippers enable the strippers to be instantly and exactly set in place, the beveled face engagement effecting a wedging, clamping action to hold the strippers perfectly rigid. These stripper blades 38 are curved so as to present concave downwardly receding stripping edges to the ginning disk faces and their ends extending inward to the spacers 6, as clearly shown in Fig. 2, so that the bunches of cotton are drawn against stripping edges obliquely to the line of movement of the disks, and hence there is a tendency for the seeds to roll along down the stripping edges outward, whereby the fiber is more gradually stripped therefrom and with much less liability to tearing and injury than would be the case were they pulled off by a straight shearing movement. The strippers are preferably formed so as to be adjustable to proper position relative to the ginning face by wedging means which may be arranged to adjust the blades up to opposite faces simultaneously.

An illustrative embodiment of one form of a pair of stripper blades and adjustment therefor is shown in Figs. 6 to 8. The blade members 42, 43 are formed of relatively heavy stock with horizontal portions 44 adapted to be clamped to the rail 34 and upwardly curving portions 45 with their ends beveled as shown at 46 to fit against the spacers 6. These blade members are individually clamped to the rail by a bolt 41 through each, and one of them, shown as 42, has bearings 46' in which an adjusting rod 47 having a milled operating head 48 is journaled. This rod is held against endwise displacement in its bearings and its inner end is journaled in a bearing lug 49 on the inner curved portion of the blade member 42. This rod is threaded for a distance from its inner end, as shown at 50, and a block nut 51 engaging this threaded portion is connected to operate a wedge shaped spreading member 52 by means of a link 53 pivotally engaged with said nut and with one of a set of holes 54 in a rib 55 fixed to said spreading member. The spreading member 52 preferably has dove-tailed engagement in an arc of circular curvature with the blade members as shown at 56, and the blade members are held mutually drawn against a spreading member so that this dove-tailed engagement is maintained by a spring 57 engaged in ears 58 extending inward from the respective blade members. The blade members are further held in alinement by a pin 59 extending into holes 60, 61 formed in the projections 39. This arrangement holds the blade members mutually tied together and maintains the spreading member in proper operative engagement therewith throughout its range of adjustment, and also aids in mutually supporting the blades and holding them in proper operative position. Any required adjustment of the blades relative to the ginning surfaces can be quickly accomplished by loosening one or both of the clamping bolts and turning the milled nut 48, which is located in a conveniently accessible position for this purpose, while the range of adjustment of the spreading member can be further extended by engaging the end of link 53 with the successive holes 54.

An important feature of the invention has to do with improved means for removing or doffing the ginned fiber from the disks, this being accomplished by air currents, and in the preferred embodiment shown, by a suction draft mechanism. The suction fan blower, which may be as shown at 62 of the type known as a "wool wheel", has an outlet 63 to the press or other delivery point and a central inlet 64 which extends the length of the gin as a receiving pipe or conduit, and has opening thereinto a collecting chute 65 which, as clearly shown in Fig. 2, slopes downward from the lower half of the ginning disks to the inlet conduit 64. The collecting chute 65 extends forwardly up to the lower edge of the stripper blades, as seen at 66, and at the back extends up opposite the edge of the disks some little distance from the bottom thereof, where it is fixed to a rail 67. A portion of the ginning disks and the space between them for some little distance above this rail 67 is included within the suction chamber thus formed by a removable shield 68 which extends along the entire series of disks and has projecting inward therefrom a series of baffle strips 69. These strips are of a width so as to leave a small space, in practice about one-quarter of an inch, at each side between the strip and the adjacent disk face, this being for the purpose of admitting air which, by reason of the suction created by the fan, is drawn through these narrow spaces in strong sheet currents which move along the sides of the disks in a direction opposite to their movement to draw off the fiber from the ginning surface and suck it downward into the collecting chute, to be thence forwarded through the wool wheel to the delivery conduit 63. The strips 69 extend inward to rest over the spacers 6 and their inner ends are tapered as seen at 70 to fit the tapering flanges 7, whereby the strips are held self-centered between the disks and properly spaced apart from each disk surface. The shield 68, with its series of baffle strips 69, is thus adapted to fit upon the rail 67 with the ends of the strips supported and held in proper position by the flanges 7, and the whole being readily removable by one or more handles 71. The outer faces of the end disks have their lower portions fitted to suitable backing at the end of the suction chute chamber, so as to prevent the entrance of air at this place, this backing, as shown, consisting of concave fiber strips 72 fixed to and extending inward from curved extensions 73 at the ends of the suction chamber. The distributer casing 24 is provided with suitable openings 74 in its lower portion to constitute a seed grid, and with a wider space farther up, constituting an opening 75 for the escape of hulls. Guards 76 fitted to a rail 77 extend downward between the ginning disks and around the upper portion of the distributer drum, these terminating at a point below the inner extremities of the stripper blades so that any throwing of the cotton in the wrong direction, backward between the disks, is prevented.

The form of ginning disk which is shown particularly in Fig. 9, the surface whereof consists of a great number of small, sharp pyramidal or conical points 78, is peculiarly adapted to coöperate with the air suction stripping action set forth, since while it effectively draws the fiber laterally off the seed in coöperation with the strippers, at the same time it has no tendency to hold the fiber from being sucked off the disks by the air currents which, after passing between the baffle 69 and the disks, have a direction of movement not only downward along the sides of the disks, but laterally away from each disk, i. e., the currents passing the opposite sides of each baffle plate thereafter tend to converge toward the central space between the disks, thus coöperating with and very materially aiding the self clearing tendency of this particular form of disk surface. The suction fan is preferably of the type shown in Figs. 2 and 3, the blades 62 being so formed that while they produce an effective suction, they are self cleared, i. e., they throw off the fiber which comes in contact with them into the delivery passage so that it has no tendency to wind into and clog up the wheel.

In operation, the cotton is fed with a fair degree of regularity by the hopper mechanism to the distributer throat 23, and thence by the oblique blades 33 it is divided and apportioned to the disk surfaces at either side. These blades also serve, in conjunction with the stripper surfaces and the casing 24, to carry out the seeds and hulls, since they move quite close to the stripper surfaces, so that the seeds are moved along to be thrown out through the grids 74, 75, the seeds after being stripped being caught and moved along what are virtually moving pockets, to the point of discharge. By reason of the mounting of the distributer drum and its casing on the arms 27, the drum and casing can be instantly swung down to permit inspection of the gin, or to make adjustments, etc. I also consider the air suction mechanism for removing the fiber from the disk surfaces to be an important feature of the invention, and I desire to cover this broadly without regard to structural details, both generally and in combination with the particular character of ginning surface disclosed. I also consider the improved form of strippers, consisting of blades receding outwardly from the radial line of disks to produce a rolling action of the seeds therealong in stripping, to be a valuable improvement, and I therefore desire the particular form of strippers, as well as of the other features shown, to be understood as illustrative and not restrictive in its exposition of the invention, which is generic in character and intended to be limited only as set forth in the appended claims.

Having described my invention, what I claim as new and desire to secure by Letters Patent, is:

1. A gin, comprising rotary disks with annular lateral ginning faces, and strippers mounted in coöperative relation thereto extending inward in a curve terminating in an approximate tangent to the inner circle of the annular disk faces.

2. A gin, comprising rotary disks with annular lateral ginning faces, and strippers mounted in coöperative relation thereto extending inward in a curve terminating in an approximate tangent to the inner circle of the annular disk faces, said curve having an outer portion approximately radial of the disks.

3. A gin, comprising rotary disks with lateral ginning faces, strippers mounted in coöperative relation to said disks and extending inward in a circular curve, having a part radial and another part approximately tangential to the inner ginning surface limit, and a one-way movable distributer mounted to move adjacent said strippers.

4. A gin, comprising a set of rotary spaced apart disks with lateral ginning faces, strippers coöperative therewith, and a movable distributer mounted in operative relation to said disks to apportion and feed cotton thereto, said distributer and said strippers being relatively formed and arranged so that movable pockets are formed to remove seeds and hulls.

5. A gin, comprising a set of rotary spaced apart disks having lateral faces, strippers mounted in coöperative relation thereto and extending inward in a substantially circular curve, and a rotary distributer adapted to feed and apportion the cotton to the disk faces and formed to provide, in conjunction with said strippers, movable pockets for removing the seeds.

6. A gin, comprising a set of rotary spaced apart disks having lateral faces, strippers coöperative therewith, and a rotary distributer provided with obliquely disposed radial blades in plate form and staggered arrangement adapted to feed the cotton and apportion the same to adjacent opposite ginning faces.

7. A gin, comprising movable plane opposite ginning surfaces, stripping mechanism coöperative therewith, and a rotary distributer having radial oblique blades adapted to apportion and distribute the cotton to said faces in like quantity to each.

8. A gin, comprising oppositely facing plane movable ginning surfaces, stripping machanism coöperative therewith, a rotary distributer arranged to apportion and distribute cotton equally to said surfaces, and a casing inclosing said distributer provided with a seed grid.

9. A gin, comprising movable parallel spaced apart ginning surfaces, strippers adjustably mounted in operative relation to said surfaces, and a common wedging means having interlocking engagement with said strippers and arranged to simultaneously adjust them with relation to said ginning surfaces.

In testimony whereof, I have signed my name to this specification, in the presence of two subscribing witnesses.

EDWIN R. BULLOCK.

Witnesses:
CLYDE L. ROGERS,
R. G. HERSEY.